US012698227B2

(12) United States Patent
Wang et al.

(10) Patent No.: US 12,698,227 B2
(45) Date of Patent: Aug. 4, 2026

(54) APPARATUS AND METHOD FOR TREATING OIL-CONTAINING SLUDGE WITH METAL-FRICHED BIOCHAR

(71) Applicant: SHENZHEN POLYTECHNIC, Shenzhen (CN)

(72) Inventors: Lei Wang, Shenzhen (CN); Beidou Xi, Shenzhen (CN); Shaofeng Li, Shenzhen (CN); Yangyang Wang, Shenzhen (CN); Xiaoshu Wang, Shenzhen (CN); Yan Shao, Shenzhen (CN); Jiancong Liu, Shenzhen (CN); Jin Liu, Shenzhen (CN); Jinsheng Wang, Shenzhen (CN)

(73) Assignee: SHENZHEN POLYTECHNIC, Shenzhen (CN)

( * ) Notice: Subject to any disclaimer, the term of this patent is extended or adjusted under 35 U.S.C. 154(b) by 344 days.

(21) Appl. No.: 18/682,956

(22) PCT Filed: Aug. 12, 2022

(86) PCT No.: PCT/CN2022/112179
§ 371 (c)(1),
(2) Date: Feb. 12, 2024

(87) PCT Pub. No.: WO2023/016555
PCT Pub. Date: Feb. 16, 2023

(65) Prior Publication Data
US 2025/0136491 A1 May 1, 2025

(30) Foreign Application Priority Data

Aug. 13, 2021 (CN) .......................... 202110930554.1

(51) Int. Cl.
*C02F 101/32* (2006.01)
*C02F 3/00* (2023.01)
(Continued)

(52) U.S. Cl.
CPC .............. *C02F 11/02* (2013.01); *C02F 3/005* (2013.01); *C02F 3/12* (2013.01); *C02F 11/08* (2013.01); *C02F 2101/32* (2013.01)

(58) Field of Classification Search
CPC .... C02F 1/40; C02F 3/005; C02F 3/12; C02F 11/02; C02F 11/15
See application file for complete search history.

(56) References Cited

FOREIGN PATENT DOCUMENTS

| CN | 105819638 A | * | 8/2016 | .............. C02F 11/00 |
| CN | 110204034 A | * | 9/2019 | ................ C02F 7/00 |
| KR | 20170115178 A | * | 10/2017 | .......... C02F 1/46104 |

OTHER PUBLICATIONS

Rao, Bin-qi—CN105819638A machine translation—Aug. 3, 2016 (Year: 2016).*

(Continued)

*Primary Examiner* — Bradley R Spies
(74) *Attorney, Agent, or Firm* — CBM PATENT CONSULTING, LLC

(57) ABSTRACT

It discloses an apparatus and a method for treating oil-containing sludge, wherein, a pressurized chamber is the main structure, and a mixture of carbonic acid in water, iron-rich biochar and polyaspartic acid is sprayed in pulses by a nano-aeration device inside the pressurized chamber. The carbonic acid is decomposed into supercritical $CO_2$ by the nano-aeration device, reducing the viscosity of petroleum hydrocarbons in the oil-containing sludge synergistically with the polyaspartic acid. The iron-rich biochar promotes dissolution of petroleum hydrocarbons from the oil-containing sludge, thus enhancing the drive-off ratio of oil phase, and improving the decomposition of residual oil organics. In the treatment of oil-containing sludge according to the present invention, high temperature retting of the separated sludge with bacterial bran increases the degree of (Continued)

humification of the sludge, the treated sludge contains petroleum hydrocarbon below 1%, and can be directly available to plants.

10 Claims, 4 Drawing Sheets

(51) Int. Cl.
*C02F 3/12* (2023.01)
*C02F 11/02* (2006.01)
*C02F 11/08* (2006.01)

(56) References Cited

OTHER PUBLICATIONS

Jin et al.—CN110204034A machine translation—Sep. 6, 2019 (Year: 2019).*
Lee, Jieun, et al. "Refractory oil wastewater treatment by dissolved air flotation, electrochemical advanced oxidation process, and magnetic biochar integrated system." Journal of Water Process Engineering 36 (2020): 101358. (Year: 2020).*
Kim Bu Yeol—KR20170115178A merged original document and FIT translation—Oct. 17, 2017 (Year: 2017).*

* cited by examiner

APPARATUS AND METHOD FOR TREATING OIL-CONTAINING SLUDGE WITH METAL-FRICHED BIOCHAR

TECHNICAL FIELD

The present invention belongs to the technical field of environmental protection, in particular to the field of solids and waste treatment, and relates to an apparatus and a method for the treatment of oil-containing sludge(s).

BACKGROUND ART

Oil-containing sludge(s) refer to a sludge mixed with heavy oils such as petroleum hydrocarbons, various finished oils, residue oils. Oil-containing sludge is not inherently occurring in nature, rather, due to various industrial, civilian, personal, etc., related to petroleum hydrocarbons, finished oils, oilfield recovery, petroleum refining processes, transportation, use, storage, etc., where petroleum hydrocarbons, finished oils flow, spill, drip, leak due to various accidents, mishandling, equipment stale, breakage, corrosion, etc., and expulsion to the ground, sedimentation into oceans, lakes, river bottoms, finally oil, soil and water are formed by mixing the oils together with soil, water, and the like, even mixtures blended with other pollutants. Main compositions of oil-containing sludges are moisture, clay particles, chemicals, organic matter, microorganisms and their metabolites and mineral oils, and water content is 10-50%, oil content is 10-40% and residue oil content is 10-30%. Oil-containing sludge is important and difficult point of pollution of oil field environments for the reasons of large production, complex composition and difficult handling.

Oil-containing sludge is not only bulky and occupies large amounts of cultivated land, polluting the surrounding soil, water and air. On the one hand, it is heavily polluting the local environment and hazardous to human health if discharged without treatment, on the other hand, it results in a large waste of resources. Therefore, achieving harmless and resourceization of oil-containing sludges is the primary goal of current treatments.

Current common treatment processes include incineration, extraction with solvent(s), biological, coking, conditioning of oil-containing sludge, integrated utilization of oil-containing sludge, etc. These treatment processes have certain drawbacks. For example, incineration discharges large amounts of pollutants into the atmosphere, extraction methods require large amounts of extractant, are costly, and the extractant is difficult to fully recover, biological processing cycles are long and difficult to scale, and other methods such as coking, conditioning and integrated utilization of oil-containing sludge suffer from high treatment costs, long treatment times and poor treatment results.

Not only that, the following problems are mainly present in existing oil-containing sludge treatment apparatus:

(1) short process flow and long treatment cycle;

(2) the treatment process produces large amounts of waste water, with low chemical recycling efficiency;

(3) high energy consumption, and sludge disposal is not on demand.

Based on above problems, there is great need to propose efficient treatment apparatus and method of oil-containing sludge for treating thorough and effective recycling of waste water and its contained chemicals.

SUMMARY

In order to overcome the problems described above, the present inventors conduct a sharp study on a method and an apparatus for the treatment of oil-containing sludges, and provide an apparatus and a method for efficiently treating oil-containing sludges, wherein, a pressurized chamber is the main structure, and a mixture of carbonic acid in water, iron-rich biochar and polyaspartic acid is sprayed in pulses by a nano-aeration device inside the pressurized chamber. The carbonic acid is decomposed into supercritical $CO_2$ by the nano-aeration device, reducing the viscosity of petroleum hydrocarbons in the oil-containing sludge synergistically with the polyaspartic acid. The iron-rich biochar promotes dissolution of petroleum hydrocarbons from the oil-containing sludge, thus enhancing the drive-off ratio of oil phase, and improving the decomposition of residual oil organics. In particular, in the treatment of oil-containing sludge according to the present invention, high temperature retting of the separated sludge with bacterial bran increases the degree of humification of the sludge, the treated sludge contains petroleum hydrocarbon below 1%, and can be directly available to plants. The present invention combines nano-aeration technology and electric fields, to circumvent the severe environment for the production of supercritical $CO_2$, reduces energy consumption and enables three-phase efficient separation of oil, water and sludge from the oil-containing sludge, thus completing the present invention.

In particular, it is an object of the present invention to provide the following aspects:

In one aspect, an apparatus for treating oil-containing sludges is provided, wherein, the apparatus comprises pressurized chamber in which electric field is connected, said electric field comprises a cathodic electrode, an anodic electrode and an external power supply, and said cathodic electrode and anodic electrode are arranged inside said pressurized chamber, and are connected by the external power supply outside said pressurized chamber.

In another aspect, it is provided a method for treating oil-containing sludges using the apparatus according to the first aspect. The method comprises: adding oil-containing sludge into a pressurized chamber, spraying a liquid containing carbonic acid and switching on an electric field, thereafter passing an oxygen-containing gas into the pressurized chamber, to achieve three-phase separation of oil, water and mud of the oil-containing sludge.

Benefits of the present invention include:

(1) The apparatus for treating oil-containing sludges provided by the present invention has simple structure, quickly achieves three-phase separation of oil, water and sludge from oil-containing sludges by combining the nano-aeration device with electric field, while circumventing harsh production environment of supercritical $CO_2$, reducing energy consumption.

(2) The method for treating oil-containing sludges provided by the present invention combines nano-aeration technology and electric field, and the oil content decline is fast and stable throughout the treatment, enabling both rapid separation or degradation of oil and deep treatment of sludge, and at the same time combining the dual requirements of the oil-containing sludge on treatment practice and treatment effectiveness, with broad application value.

(3) By the method for treating oil-containing sludge according to the present invention, the removal of petroleum hydrocarbons in the treated sludge exceeds 99%, the treated water contains a high amount of carbonic acid and is reusable, and the oil phase is recovered and can be re-used, achieving the technical goals of reduced-quantification, harmless and resource-efficient treatment of solids waste as a whole.

EMBODIMENTS

Figure 1:
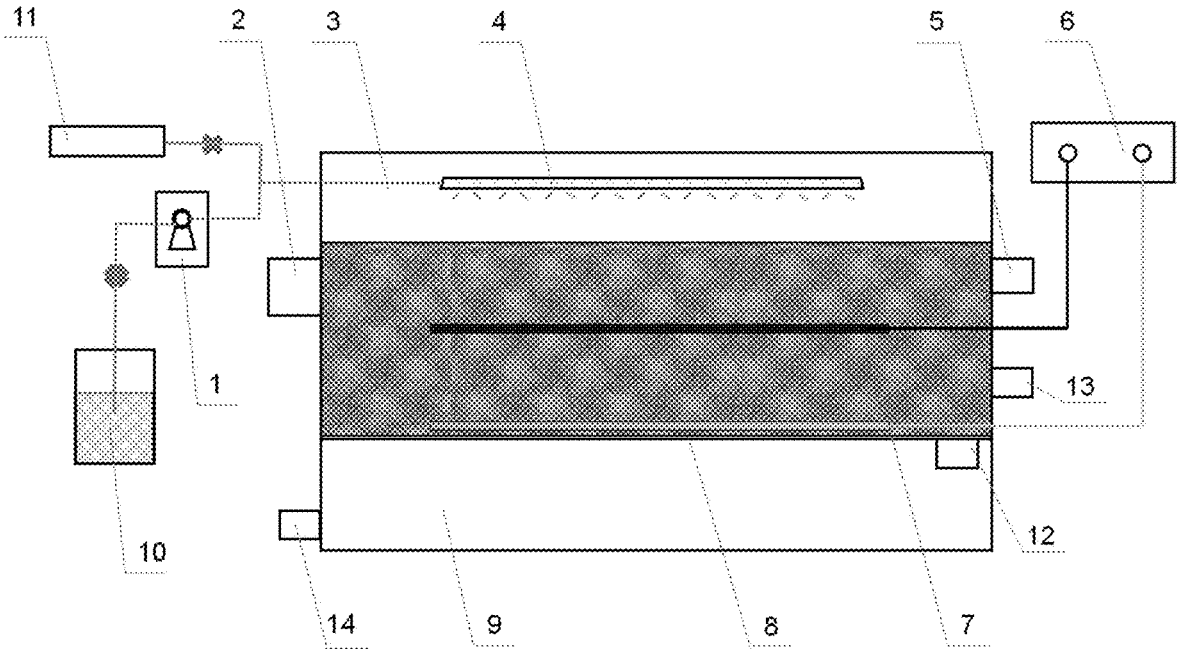
FIG. 1 shows a schematic illustration of the apparatus for treating oil-containing sludge according to a preferred embodiment of the present invention.

The present invention will be described in further detail below by means of the accompanying drawings and examples. The characteristics and advantages of the present invention will become clearer from these descriptions.

The word "exemplary" used herein exclusively means "serving as example, embodiment, or illustration." Any embodiment described herein as "exemplary" is not necessarily to be construed as preferred or advantageous over other embodiments. Although various aspects of embodiments are shown in drawings, drawings are not necessarily drawn to scale, unless specifically noted.

Since the beginning of $CO_2$ oil-displacing technology studies in the United States in the 1950s, rapid technology development, it has now become a dominant technology. $CO_2$ as an excellent oil-displacing agent, its advantages are mainly manifested in several aspects: Characteristics of high density, low viscosity, easy solubility in crude oil and water, extraction of light components in crude oil by $CO_2$, and easy liquefaction. $CO_2$ will be in supercritical at temperatures above 31° C. and pressures above 7.4 MPa, where the gas-liquid interface will disappear, and $CO_2$ will not be liquefied by increasing pressure, where the density of $CO_2$ is close to that of a liquid, and the viscosity is close to that of a gas, referred to as supercritical $CO_2$.

Supercritical $CO_2$ has some special physical properties, mainly expressed by having diffusivity similar to that of a gas, the properties of both low viscosity and low surface tension. Its diffusion coefficient is more than 100 times that of conventional liquids, and surface tension is much less than that of conventional liquids, while its viscosity is more than 2 orders of magnitude lower than that of conventional liquids. As the mole fraction of injected gas increases, the viscosity of petroleum hydrocarbons drops rapidly, and when the injection pressure reaches 21 MPa, the volume expansion is 1.4 times, and the viscosity of crude oil decreases by 0.32 times, which shows viscosity reducing effect is significant by injection of $CO_2$. Light hydrocarbons is extracted from crude oil and vaporized by $CO_2$, and oil-water interfacial tension can drastically reduce with significant amounts of light hydrocarbons being mixed with $CO_2$, and thus oil-displacing effect is improved.

The present invention, depending on supercritical $CO_2$ properties, combines nano-aeration technology and applied electric field, circumvents the demanding environment for supercritical $CO_2$ generation, reduces energy consumption, enables efficient separation of three phases of oil, water and sludge (or mud) in the oil-containing sludges, the oil phase is recyclable, which shows significant effect for the treatment of oil-containing sludge.

The invention is detailed below.

In one aspect, the present invention aims at providing an apparatus for treating oil-containing sludge, and the main structure of the apparatus is a pressurized chamber 3.

Wherein, the bottom of the pressurized chamber 3 is connected to receiving chamber 9, and an outfeed 12 is provided at bottom end of the pressurized chamber 3. The upper end of the outfeed 12 is grate structure, avoiding that oil-containing sludge in the pressurized chamber 3 is not reacted and is injected directly into the receiving chamber 9.

In the present invention, an electric field is also connected in said pressurized chamber 3, and said electric field comprises a cathodic electrode 7, an anodic electrode 8 and an external power supply 6. The cathodic electrode 7 and the anodic electrode 8 are arranged in an up-down manner inside the pressurized chamber 3, and are connected between them by the external power supply 6 outside the pressurized chamber 3, where the anodic electrode 8 is located below the cathodic electrode 7.

Said cathodic electrode 7 is Sartorius PY-ASI three-in-one plastic electrode, E-201-9 PH composite electrode or Korea 1.0 plastic electrode CON 1134-13, preferably Sartorius PY-ASI three-in-one plastic electrode. Said anodic electrode 8 is cast iron electrode, copper zinc electrode, platinum electrode, preferably cast iron electrode.

Further, nano-aeration device 4 is provided at top of pressurized chamber 3, feeding port 2 is provided at side wall, and oil outlet 5 is provided at upper part of other side wall and water outlet 13 is provided at lower part, as shown in FIG. 1.

Said nano-aeration device 4 comprises aeration pipe 41 and aeration pipe holder 42, which fixedly mounting aeration pipe 41.

Figure 2:
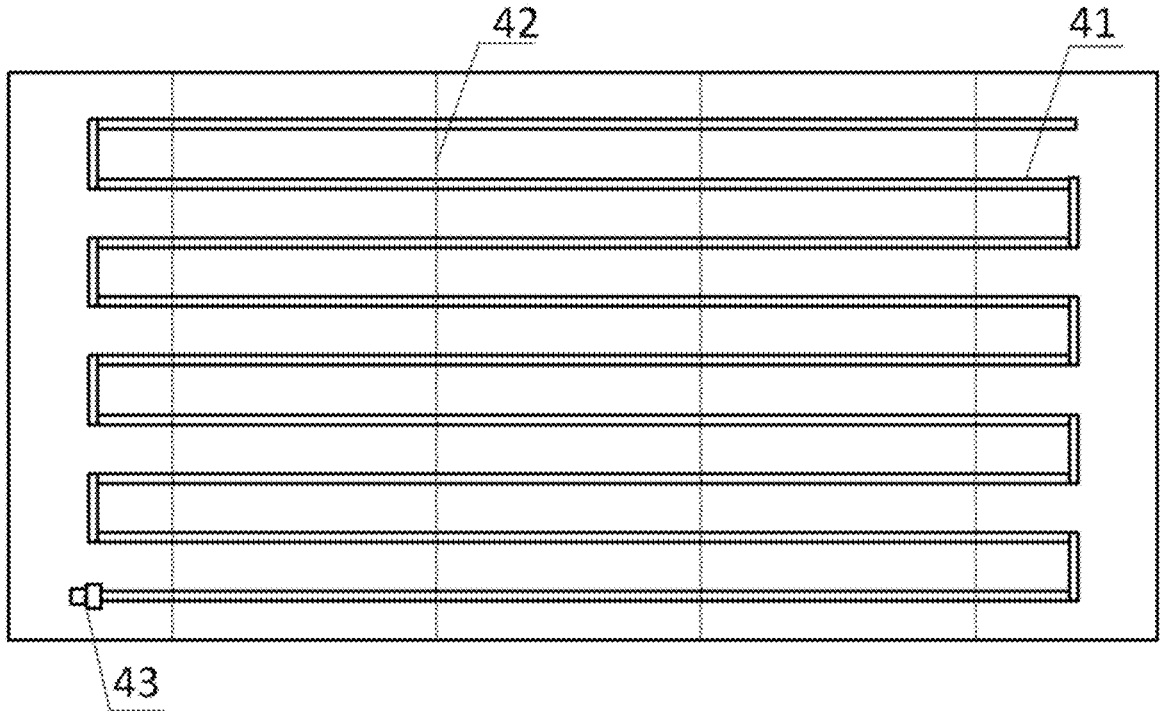
FIG. 2 shows a schematic illustration of the nano-aeration device according to a preferred embodiment of the present invention.

In accordance with the present invention, aeration pipe 41 is provided at one end with a joint 43 for connecting the pipe ports of the feeding device, and the aeration pipe 41 is arranged in a square winding, with higher distribution density and higher aeration efficiency per unit area compared to other structural shapes, as shown in FIG. 2.

Figure 3:
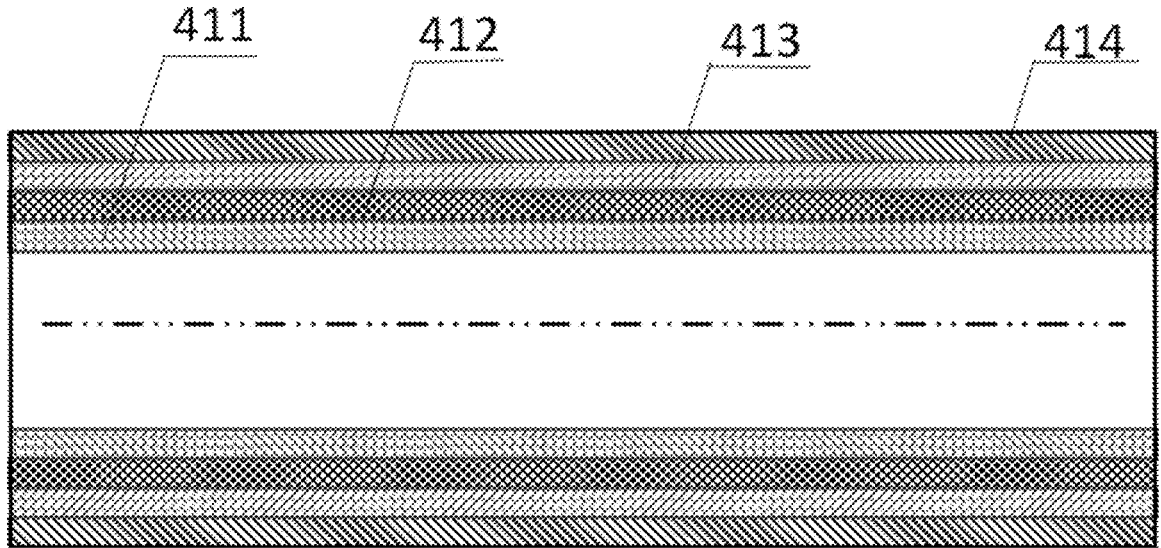
FIG. 3 shows a schematic illustration of the aeration tube according to a preferred embodiment of the present invention.

According to the present invention, said aeration pipe 41 comprises lined hose 411 having ventilation holes opened at peripheral wall, breathable fabric 412 encasing the lined hose 411, polytetrafluoroethylene aeration membrane 413 encasing the breathable fabric 412, and breathable protective layer 414 encasing the polytetrafluoroethylene aeration membrane to protect it from contaminant attachment. A gas is ejected through gas permeable holes of lined hose 411, and uniformly diffuses through breathable fabric 412, then is cut into nano-sized bubbles by polytetrafluoroethylene aeration membrane 413, and finally uniformly diffuses through breathable protective layer 414 into the pressurized chamber 3, as shown in FIG. 3.

Further, the lined hose 411 is preferably a porous plastic tube having an outer diameter of 10-30 mm, an inner diameter of 5-20 mm, and the gas permeable hole has a pore diameter of 0.01-0.05 mm and a porosity of 55-90%. Preferably the lined hose 411 has an outer diameter of 20-22 mm, an inner diameter of 8-11 mm, and the gas permeable hole has a pore diameter of 0.02-0.03 mm and a porosity of 75-85%. The breathable fabric 412 is preferably a non-woven fabric, and the breathable protective layer 414 is woven fabric such as polyester, polyamide, aramide, or the like, and is thermoplastic compounded with the polytetrafluoroethylene aeration membrane 413 having a thickness of 0.05-0.2 mm, distributed with aeration holes having a pore size of 0.05-0.2 m and a porosity of 60-95%, preferably a thickness of 0.1-0.1 mm, a pore size of 0.1-0.15 m and a porosity of 80-90%.

Upon reaction, the gas is ejected through the gas permeable holes, and uniformly diffuses through the breathable fabric 412, then is cut by the aeration holes of the polytetrafluoroethylene aeration membrane 413. Therefore, the gas mass transfer resistance through the Teflon aeration membrane 413 decreases, enables more uniform and efficient segmentation of the gas into micro-nanometer scale, and the smaller the bubbles, the longer the contact time of the gas per volume with the oil-containing sludge, and the more dissolved gas, the more sufficient reaction, the more uniform gas distribution, which greatly increasing the gas utilization.

In the present invention, the polytetrafluoroethylene membrane 413 has ultra-high hydrophobicity and is capable of persistently retaining hydrophobicity from being hydrophilic, effectively separating the aqueous and gaseous phases, and preventing increased aeration resistance when liquids enter the pipes.

In the present invention, the polytetrafluoroethylene aeration membrane 413 is coated with antimicrobial treated woven cloth, such as polyester, polyamide, aramide, or the like as the breathable protective layer 414, thus the micro-nano-bubbles segmented by the polytetrafluoroethylene aeration membrane 413 are able to exit the surface rapidly of polytetrafluoroethylene aeration membrane 413, and the polytetrafluoroethylene aeration membrane 413 is protected from contaminant attachment, avoiding blockage of aeration holes by contaminants affecting aeration effectiveness and efficiency, with longer use life.

Of course, nano-aeration device 4 can also be used to transport liquid, which is divided into small vacuoles by the nano-aeration device 4, improving reaction efficiency.

According to the present invention, a temperature controller and a pressure regulator are also connected externally to said pressurized chamber 3, facilitating the regulation of the reaction temperature inside the pressurized chamber 3, as well as the control of the pressure inside the pressurized chamber 3.

Oil-containing sludge is added to the pressurized chamber 3 through the feeding port 2 before reaction, which cannot be added lower than the level at which the cathodic electrode 7 is located in the pressurized chamber 3.

In the present invention, carbonic acid in water is sprayed in pulses by the nano-aeration device 4 into the pressurized chamber 3, and the temperature controller connected to the pressurized chamber 3 provides a heat source for the reaction, decomposing the carbonic acid in water to produce carbon dioxide, which is pressed by nano-aeration to bring carbon dioxide to a critical pressure, to arrive a supercritical state, which generates bubbles having a particle size on the order of nanometers, and the instantaneous chemical energy produced upon breaking of the nano-bubbles further intensifies the supercritical state of the $CO_2$ to the effect of reducing the viscosity of the petroleum hydrocarbons and enabling more efficient detachment of the petroleum hydrocarbons from the solid particles.

In the present invention, the side wall end of the receiving chamber 9 is provided with a tap hole 14.

Upon reaction, the viscosity of the oil-containing sludge in the pressurized chamber 3 decreases under the action of supercritical $CO_2$. At the same time, due to the electric field in the pressurized chamber, by means of a combined action such as electron mobility, electrophoresis, and the like, water and hydrocarbons in the oil-containing sludge undergo a directional migration under the action of the electric field, and accumulate in the vicinity of the cathodic electrode, while the solid phase components move in the direction of the anodic electrode, thus effecting phase separation. The oil with low density floats in the upper layer of the pressurized chamber 3, and can be discharged through the oil outlet 5 in the sidewall of the pressurized chamber 3.

In the present invention, feeding devices are connected to said nano-aeration device 4, and said feeding devices comprise liquid-feeding device and gas-feeding device 11.

Further, said liquid-feeding device comprises liquid storage device 10 for holding the liquid containing carbonic acid and water pump 1. The liquid containing carbonic acid in the liquid storage device 10 is delivered to the nano-aeration means 4 by the water pump 1 to spray in pulses and carbonic acid is decomposed.

Wherein, said gas-feeding device 11 is used to deliver air or oxygen needed for treating oil-containing sludges.

Residual oil is contained in the de-oiled water, and in order to enhance decomposition removal of the residual oil organics, bubbling oxygen-containing gas from the gas-feeding device 11 into the pressurized chamber 3 through the nano-aeration device 4 to accelerate the mass transfer of oxygen from the gas phase to the liquid phase. The residual oil organics are oxidated for removal under the action of the electric field. The water removed off residual oil is discharged from the water outlet 13, and the solid-phase components therein are further retted at high temperatures, increasing their degree of huming, and enter into the receiving chamber 9 through the outlet 12 at the bottom of the pressurized chamber 3, and then is discharged from the tap hole 14, to be utilized by plants.

Another aspect of the present invention also aims to provide a method for treating oil-containing sludges, and the method is implemented with the apparatus according to the first aspect. Said method comprises: adding oil-containing sludge into the pressurized chamber 3, spraying the liquid containing carbonic acid and switching on the electric field, thereafter passing an oxygen-containing gas into the pressurized chamber 3, to achieve a three-phase separation of oil, water and mud of the oil-containing sludge.

In the treatment of the oil-containing sludge according to the invention, the voltage of the electric field is controlled to be 0.3-1.2 V, preferably 0.6-0.8 V by means of the external power supply 6.

In the present invention, said oil-containing sludge is added into the pressurized chamber 3 through the feeding port 2, which cannot be added in an amount lower than the level at which the cathodic electrode 7 is located in the pressurized chamber 3.

Further, the liquid containing carbonic acid is delivered by water pump 1 to the nano-aeration device 4, spraying in pulses to effect aeration.

According to preferred embodiments, the liquid containing carbonic acid further comprises polyaspartic acid and a co-solvent, and the co-solvent is iron-rich biochar.

Wherein, the polyaspartic acid is present in the liquid at a concentration of 1 to 20 mg/L, preferably 5 to 15 mg/L; and the iron-rich biochar represents 0.1-10%, preferably 1-5% of the total weight of the oil-containing sludge.

In the present invention, the liquid sprayed with a flow rate of 0.05 to 1.5 L/min, preferably 0.1 to 0.8 L/min.

The nano-aeration method has the advantage of slow rate of rise and long hydraulic retention time of bubble diameter in the micro-nanometer scale, even nano-meter scale, compared to other treatment processes of oil-containing sludge. The nano-aeration method is used to spray in pulses the liquid into the device at specific flow rate, to ensure bubble particle size in the nano-meter scale. Carbon dioxide is allowed to reach a supercritical state well below the critical pressure. The instantaneous chemical energy produced upon nano-bubble rupture can strengthen the supercritical state of $CO_2$ in the bubble, utilizing its inherent attributes to reduce petroleum hydrocarbon viscosity.

Polyaspartic acid in the liquid is capable of intensifying solubilizing stream effect of petroleum hydrocarbons, maintaining formation of $CO_2$ bubbles, and increasing chemical energy at which bubbles break.

In addition, based on strong effective adsorption and capture of iron-rich biochar, addition of iron-rich biochar as the co-solvent can overcome octanol-water partition coefficient of petroleum hydrocarbons, promote dissolution of petroleum hydrocarbons from sludge, and enhance oil phase drive-off.

According to the present invention, said iron-rich biochar is produced by adding an iron source during growing of emergent plants, being collected and sintered.

In the present invention, the emergent plant is preferably selected from the group consisting of iris, bushels, water chestnut, lotus, water hemp, or cattails, more preferably iris with excellent enrichment of iron.

In the present invention, the broth used to grow emergent plants is Hoagland broth.

Said iron source comprises inorganic iron source, organic iron source or chelated iron, preferably chelated iron, such as Fe-EDTA, Fe-DTPA, Fe-HEDTA, Fe-EDDHA and like, more preferably Fe-DTPA.

The inventors found that, emergent plant, such as iris, not only has a strong ability to enrich iron elements in Fe-DTPA, but the effect of removing organics from the iron-rich biochar produced when used to treat oil-containing sludge is more pronounced.

According to the invention, the concentration of iron elements in the broth is 200-600 mg/L, preferably 300-400 mg/L, more preferably 350 mg/L.

In the present invention, emergent plants absorb iron elements in situ and then are sintered under high temperature conditions, where the iron elements are reduced by carbon to zero valent iron, effectively enhancing the electron transfer capacity of biochar, enabling rapid decomposition of organics in the oil-containing sludge.

Wherein, the sintering comprises:

Low temperature stage: temperature of 300-630° C., time of 0.1-5 h, heating rate of 3-9° C./min;

High temperature phase: temperature of 650-900° C., time of 1-6 h, heating rate of 6-10° C./min.

Preferably, said sintering comprises:

Low temperature stage: temperature of 400-600° C., time of 0.5-3 h, heating rate of 5-8° C./min;

High temperature stage: temperature of 700-850° C., time of 2-4 h, heating rate of 7-9° C./min.

More preferably, the sintering comprises:

First stage: temperature of 500° C., time of 1 h, heating rate of 6° C./min;

Second stage: temperature of 800° C., time of 3 h, heating rate of 8° C./min.

In the present invention, when the electric field is turned on, simultaneously opening the temperature regulator outside the pressurized chamber 3, controlling the temperature of 25-40° C., for example 32° C., and the reaction is carried out until the oil-containing sludge has a petroleum hydrocarbon content of 1-5%, and then the aeration is stopped, thereafter the oil outlet 5 is opened and the oil inside the pressurized chamber 3 is discharged, after which the gas inlet device 11 is opened and air or oxygen is continuously introduced into the pressurized chamber 3 through the nano-aeration device 4 to the end of the reaction.

According to the invention, the viscosity of the oil-containing sludge decreases under the action of supercritical $CO_2$. Meanwhile, water and hydrocarbons in the oil-containing sludge accumulate in the vicinity of the cathodic electrode under the action of the electric field, while the solid phase components move in the direction of the anodic electrode, and most of the oil with low density, distributed over the water, can be discharged through the oil outlet 5.

Wherein, since the water after flooding contains small amount of oil, that is, residual oil, or known as petroleum hydrocarbons, the nano-aeration device 4 is controlled to feed with air or oxygen, and the temperature regulator outside the pressurized chamber 3 is opened, the reaction temperature is adjusted to 150-400° C., preferably 220-350° C., the pressure is adjusted by the pressure regulator outside the pressurized chamber 3 from 1 to 8 MPa, preferably from 3 to 5 MPa, to allow wet oxidation treatment of residual oil.

According to the present invention, the flow rate of continuous air or oxygen is 0.5 to 10 L/min, preferably 1 to 7 L/min, more preferably 3 to 5 L/min.

In the present invention, upon air or oxygen reaction, iron-rich biochar contained in the system has an abundance of active surface groups, accelerating the mass transfer process of oxygen from the gas phase to the liquid phase, increasing the rate of chemical reaction between the dissolved oxygen and the substrate, and enhancing decomposition removal of residual organics.

According to the present invention, after the reaction by feeding air or oxygen in the pressurized chamber 3 for 0.5-5 h, preferably 1-3 h, in which the water contains almost no residual oil, but a significant amount of carbonic acid, after being discharged through the water outlet 13, can be recovered for the treatment of the next batch of oil-containing sludge.

According to the present invention, after discharging the water, the remaining solid phase component in the pressurized chamber 3 is mud and to restore the natural properties of the mud, the humidity of the mud and the mud mixture is adjusted to 30-80% while adjusting the temperature to 50-90° C. and retting is carried out at high temperature for 40-100 h to increase its degree of humification. The resulting mud has natural properties and the treated mud contains a content of petroleum hydrocarbons lower than 1% and can be directly used by plants.

Further, humidity of mud and inoculant mixture was adjusted to 40-65%, while the temperature is adjusted to 70-75° C., high temperature retting is carried out for 60-84 h.

Further, the inoculant is preferably EM inoculant or microbial inoculant VT-1000. The EM inoculant and microbial inoculant VT-1000 contain plurality of microorganisms and are efficient in retting.

According to the present invention, the inoculant is liquid species with a concentration of $10^9$-$10^{10}$/mL. The inoculant is added to the liquid storage device 10, and then is added into the pressurized chamber 3 by means of the water pump 1 connected to the nano-aeration device 4.

According to the present invention, iron-rich biochar is used as bioelectrochemical carrier in combination with composting process for fast removal of residual contaminants and restoring natural properties of mud.

In the present invention, the weight ratio of the inoculum (bacterial fluid) to mud is 1:(100-1000), preferably 1:(100-300).

According to the invention, after high temperature retting, mud enters the receiving chamber 9 through the outlet 12 at the bottom of the pressurized chamber 3 and is discharged through the tap hole 14.

The invention is further illustrated below with reference to the Examples.

EXAMPLES

Example 1

(1) Preparation of Iron-Rich Biochar

Iris sibiria was planted in an incubator with Hogland nutrient solution. After one week, Fe-DTPA was dissolved in distilled water, and added to the culture broth. The finally resulting broth had a concentration of 350 mg/L iron elements, and culturing was carried out for 60 days. During culturing, the nutrient solution in the incubator was changed over a period of 7 days, keeping the pH of the aqueous solution in the incubator controlled to be in the range of 5.8-6.0. After the end of the experiment, the iris sibiria was oven-dried at 80° C. to constant weight, then crushed to particle size 8-9 mm and sintered using a tube muffle furnace in nitrogen atmosphere as follows to yield iron-rich biochar:

First stage: the temperature is 500° C., the time is 1 h, and the heating rate is 6° C./min;

Second stage: temperature is 800° C., the time is 3 h, and the heating rate is 8° C./min.

(2) Treatment of Oil-Containing Sludge

Oil-containing sludge was collected from Henan Oilfield Corporation, and the oil-containing sludge contained water of 60 wt %, oil of 10 wt %, and mud of 30 wt %.

Polyaspartic acid and iron-rich biochar prepared in step (1) were added to an aqueous solution having carbonic acid with a concentration of 0.038 mol/L to obtain mixed liquor ready-to-use having polyaspartic acid with a concentration of 10 mg/L and iron-rich biochar was 3% of total weight of the oil-containing sludge.

The above collected oil-containing sludge was fed into the pressurized chamber 3 through the feeding port 2, and the mixed liquor was contained in the liquid storage device 10 and was delivered to the nano-aeration device 4 by water pump 1, and then was sprayed into the pressurized chamber 3 at a flow rate of 0.5 L/min. Simultaneously cast iron electrode (available from Longer Ship Electric Co. Ltd.) was used as anodic electrode 8, sartorius PY-ASI three-in-one plastic electrode (available from Sartorius Co.) was used as cathodic electrode 7, and external power supply 6 was turned on, controlling the voltage of 0.6 V, and the temperature regulator outside the pressurized chamber 3 was turned on, controlling the temperature of 32° C. After reaction for 16 h, oil outlet 5 was opened to discharge the oil from the pressurized chamber 3.

Then, the temperature was regulated to 305° C. by the temperature regulator, and the pressure regulator was turned on and the pressure was adjusted to 4 MPa. The gas-feeding device 11 was turned on, and oxygen was passed continuously through the nano-aeration device 4 at a flow rate of 4 L/min into the pressurized chamber 3 until the end of the reaction. After feeding oxygen for 2 h, water was discharged through the water outlet 13, at which point the discharged water contained a significant amount of carbonic acid, fully satisfying the processing of the next batch of oil-containing sludge, which could be directly recycled.

The pressure regulator outside the pressurized chamber 3 was closed after water being discharged, and the temperature was regulated by the temperature regulator to 72° C., EM inoculant (produced by Shanghai Ditian Biotech Co. Ltd.) was scaled up to liquid species at a concentration of $10^9$-$10^{10}$/mL, and was added to liquid storage device 10, and then was added to the pressurized chamber 3 via water pump 1 connected to the nano-aeration device 4, wherein the weight ratio of mud to EM inoculant was 250:1, while adjusting the mixture of mud and inoculant to 60% humidity, and retting for 72 h.

After completion of the reaction, dewatering rate of the oil-containing sludge was 95%, oil removal rate was 98%, resource extraction rate of oil was 92%, and removal rate of petroleum hydrocarbons from sludge was 99.2%.

Figure 4:
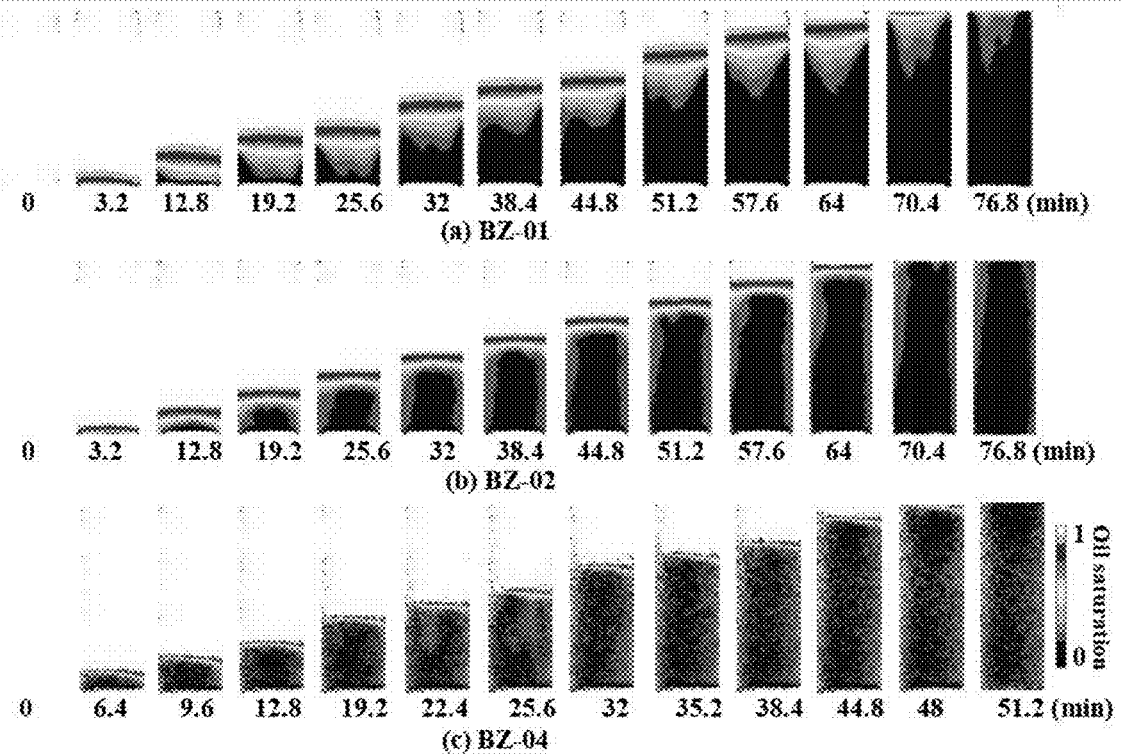
FIG. 4 shows a graph of variation of oil residue with different particle size of sludge media as function of time in Example 1.

Three-dimensional fluorescence spectroscopy was used to determine residual oil saturation at retting, and residual oil change in sludge media over time with different particle sizes is shown in FIG. 4, and it can be seen that residual oil decrease in sludge media over time with 0.1 mm (BZ-01), 0.2 mm (BZ-02), 0.4 mm (BZ-04) particle sizes.

The present invention is described in detail above in connection with preferred embodiments and illustrative examples. It is nevertheless stated that these specific embodiments are only illustrative explanations of the invention, and no limitation is to be placed upon the scope of protection of the present invention. Various modifications, substitutions or modifications may be made to the technical disclosure and its embodiments without departing from the spirit and scope of protection of the invention, all falling within the scope of protection of the invention. The scope of protection of the invention shall be subject to the appended claims.

What is claimed is:

1. A method for treating oil-containing sludge, wherein the method is implemented with an apparatus;

the method comprises: adding oil-containing sludge into a pressurized chamber (3), spraying a liquid containing carbonic acid and switching on electric field, thereafter passing an oxygen-containing gas into the pressurized chamber (3), to achieve three-phase separation of oil, water and mud of the oil-containing sludge.

2. The method according to claim 1, characterized in that, voltage of electric field is controlled to be 0.3-1.2 V throughout reaction by external power supply (6).

3. The method according to claim 1, characterized in that, the liquid containing carbonic acid is delivered by water pump (1) to nano-aeration device (4) for aeration.

4. The method according to claim 1, characterized in that, the liquid containing carbonic acid further comprises polyaspartic acid and a co-solvent, and the co-solvent is iron-rich biochar.

5. The method according to claim 1, characterized in that, when electric field is turned on and the reaction is carried out until the oil-containing sludge has a petroleum hydrocarbon content of 1-5%, and then the aeration is stopped, thereafter oil outlet (5) is opened and the pressurized chamber (3) is discharged, after which gas inlet device (11) is opened and air or oxygen is continuously introduced into the pressurized chamber (3) to the end of the reaction.

6. The method according to claim 1, characterized in that, after the reaction by feeding air or oxygen in the pressurized chamber (3) for 0.5-5 h, water outlet (13) is opened to discharge the water, and bacterial bran is added in the pressurized chamber (3) and retting is carried out at high temperature for 40-100 h.

7. The method according to claim 1, wherein the apparatus comprises the pressurized chamber (3) in which electric field is connected, said electric field comprises cathodic electrode (7), anodic electrode (8) and external power supply (6), and the cathodic electrode (7) and the anodic electrode (8) are arranged inside the pressurized chamber (3), and are connected by the external power supply (6) outside the pressurized chamber (3).

8. The method according to claim 7, wherein nano-aeration device (4) is provided at top of the pressurized chamber (3), feeding port (2) is provided at side wall, and oil outlet (5) is provided at upper part of other side wall and water outlet (13) is provided at lower part.

9. The method according to claim 8, wherein the nano-aeration device (4) comprises aeration pipe (41) and aeration pipe holder (42), which fixedly mounting the aeration pipe (41).

10. The method according to claim 9, wherein the aeration pipe (41) comprises liner hose (411) having ventilation holes opened at peripheral wall, breathable fabric (412), polytetrafluoroethylene aeration membrane (413) and breathable protective layer (414).

* * * * *